(No Model.)
V. BARABAN.
CHAFING DISH.
No. 547,759.  Patented Oct. 15, 1895.
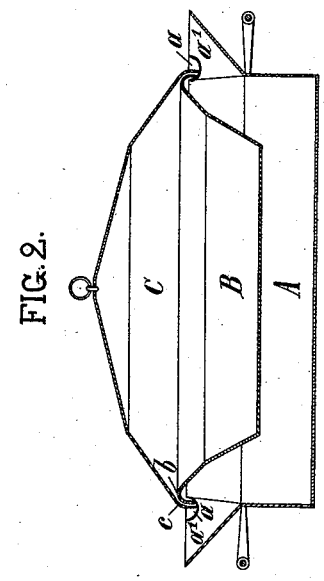
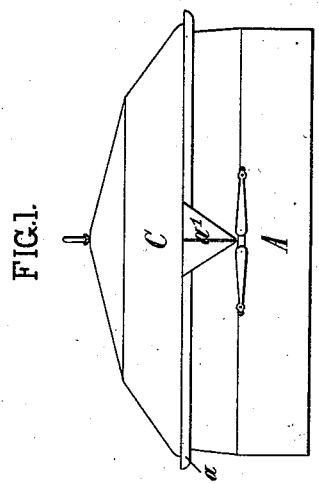
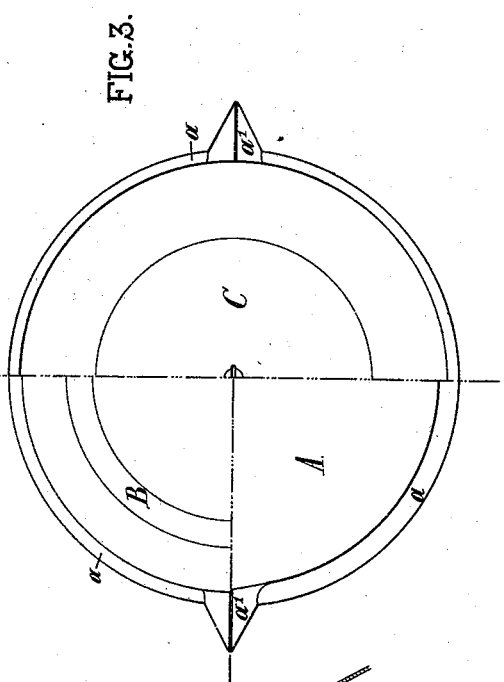
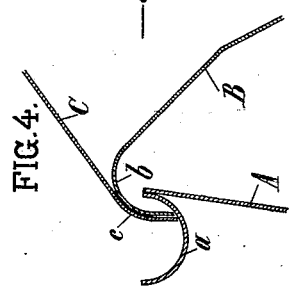
Witnesses.
E. B. Bolton
E. A. Scott
Inventor:
Victor Baraban
By _____
his Attorneys.

UNITED STATES PATENT OFFICE.

VICTOR BARABAN, OF NEUILLY, FRANCE.

CHAFING-DISH.

SPECIFICATION forming part of Letters Patent No. 547,759, dated October 15, 1895.

Application filed January 8, 1895. Serial No. 534,219. (No model.) Patented in France November 5, 1894, No. 239,256.

*To all whom it may concern:*

Be it known that I, VICTOR BARABAN, a citizen of France, and a resident of Neuilly-sur-Seine, France, have invented new and useful Improvements in Chafing-Dishes, (for which I have obtained Letters Patent in France November 5, 1894, No. 239,256,) of which the following is a specification.

Dishes which are warmed up lose more or less of their taste, and those warmed upon a fire-stove or a steam apparatus with water-joint have generally a bad taste in consequence of the excess of heat. The chafing-dish which constitutes the subject-matter of the present application remedies these objections by providing a device capable of warming up the foods without the loss of their original savor, and adapted also to be used for the cooking of dishes where a temperature of 100° will be sufficient—such, for instance, as vegetables, eggs, dairy dishes, creams, &c. This requires a dish or receptacle in which the food will be hermetically inclosed as long as the inner pressure does not exceed the outer one, so as to keep the savor.

In the drawings, Figure 1 is an outside elevation view; Fig. 2, a sectional view in elevation; Fig. 3, a plan view of three different parts of the apparatus, and Fig. 4 a sketch of the closing means.

A is the reservoir for the water constituting the bath. The edge thereof is provided with a groove $a$, all around which is interrupted only by the two recesses $a'$, by which the interior of the reservoir is put in communication with the groove.

B is the dish upon which the food is placed and which rests in the groove $a$ by means of its curved rim.

C is the removable lid or cover, the rim $c$ of which is curved and shaped so as to correspond exactly with the shape of the rim $b$. The cover reposes also in the groove $a$, yet in such a manner that it leaves a capillary space only open downward all around the apparatus between the curved parts $b$ and $c$.

The reservoir containing the water is put upon the stove, the dish B containing the food is put within the same, and the whole is covered by the lid C. After having reached a temperature of 100° the water boils and the contents of the dish will soon reach the same temperature. The water contained in the food evaporates and gathers upon the cover in the shape of vapor. The arched shape of the said cover makes the accumulated vapor run off, which fills the space between $b$ and $c$ and thus forms a closure. In case the pressure in the dish would exceed that of the atmosphere the water in the capillary space would partially run off into the groove $a$ and from there into the reservoir. The condensed water can never run off outside of the apparatus or in the fire. The food can never be exposed to a higher temperature than 100°, and neither savor nor odor can escape. Nothing can be lost except a few drops of water.

The chafing-dish can be constructed in any suitable manner, and can be provided with handles or knobs, as desired.

I claim—

A chafing dish comprising the water receptacle A, the dish B having a turned over edge, the cover having a downwardly extending edge corresponding to that of the dish and forming a capillary space between the same and the edge of the dish opening downwardly, the groove in the receptacle A, into which the edge of the cover and the edge of the dish and with which the capillary space connects, and the recesses $a'$ from the grooves and below the bottom of the same to constantly drain the said groove and lead the water back to the receptacle A, said groove being arranged to drain the joint between the edges whereby said edges will hold in the capillary space the condensed steam to form a water seal which will be blown out when the pressure within the dish becomes excessive, substantially as described.

In testimony that I claim the foregoing as my invention I have signed my name, in presence of two witnesses, this 28th day of November, 1894.

VICTOR BARABAN.

Witnesses:
   M. CORROYER,
   CLYDE SHROPSHIRE.